(12) United States Patent
Allis et al.

(10) Patent No.: US 10,464,087 B2
(45) Date of Patent: Nov. 5, 2019

(54) MIX ON DEMAND SPRAYER

(71) Applicant: Chapin Manufacturing, Inc., Batavia, NY (US)

(72) Inventors: Morgan Allis, Batavia, NY (US); Jim Fontaine, Batavia, NY (US); David Dubiel, Batavia, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 47 days.

(21) Appl. No.: 15/725,937

(22) Filed: Oct. 5, 2017

(65) Prior Publication Data
US 2019/0105672 A1 Apr. 11, 2019

(51) Int. Cl.
| B05B 7/04 | (2006.01) |
| A01M 7/00 | (2006.01) |
| B05B 7/24 | (2006.01) |
| B05B 7/26 | (2006.01) |
| B05B 7/30 | (2006.01) |
| B05B 7/14 | (2006.01) |

(52) U.S. Cl.
CPC ......... *B05B 7/0408* (2013.01); *A01M 7/0032* (2013.01); *A01M 7/0042* (2013.01); *A01M 7/0092* (2013.01); *B05B 7/1459* (2013.01); *B05B 7/2486* (2013.01); *B05B 7/2497* (2013.01); *B05B 7/26* (2013.01); *B05B 7/30* (2013.01)

(58) Field of Classification Search
CPC ... B05B 7/0408; B05B 7/1459; B05B 7/2486; B05B 7/2497; B05B 7/26; A01M 7/0032; A01M 7/0035; A01M 7/0039; A01M 7/0042; A01M 7/0046; A01M 7/0082; A01M 7/0085; A01M 7/0092
See application file for complete search history.

(56) References Cited

U.S. PATENT DOCUMENTS

| 2,788,245 A | 4/1957 | Gilmour |
| 2,991,939 A * | 7/1961 | Packard .................... B05B 7/12 |
| | | 239/114 |

(Continued)

OTHER PUBLICATIONS

NorthStar ATV Spot Sprayer—10-Gallon Capacity, 1 GPM, 12 Volt; http://www.northemtool.com/shop/tools/product_200631851_200631851?cm_mmc=Google-pla&utm_source=Google_PLA&utm_medium=Lawn%20%2B%20Garden%20%3E%20Sprayers%20%3E%20Broadcast%20%2B%20Spot%20Sprayers&utm_campaign=NorthStar&utm_content=2681022&gclid=Cj0KCQjw8b_MBRDcARIsAKJE7lmwtL81llMUbQLnG0bzly3KSQs0wh5BeQojYUjxt-ESz0hdaopvW_0aAorHEALw_wcB (Accessed Aug. 1, 2017).

(Continued)

*Primary Examiner* — Darren W Gorman
(74) *Attorney, Agent, or Firm* — Woods Oviatt Gilman LLP; Katherine H. McGuire, Esq.

(57) ABSTRACT

A sprayer system includes a diluent tank, a mounting bracket mounted to the diluent tank and a concentrate tank mounted to the mounting bracket and diluent tank. A mixing manifold is mounted to the mounting bracket and has a first inlet fitting to receive a fixed amount of diluent and a second inlet to receive a liquid concentrate. The diluent and concentrate are then combined to form a mixed solution. The mixing manifold includes an outlet. A positive displacement pump is mounted to the mounting bracket and has a suction port fluidly coupled to the mixed solution outlet. A pressure port may fluidly couple with a spray device. The second tank may be separable from the first tank and mounting bracket without requiring removal of the mixing manifold or positive displacement pump.

17 Claims, 10 Drawing Sheets

(56) References Cited

U.S. PATENT DOCUMENTS

| | | | |
|---|---|---|---|
| 3,921,907 A * | 11/1975 | Anderson | A01M 7/0092 222/608 |
| 4,790,454 A | 12/1988 | Clark et al. | |
| 4,821,959 A * | 4/1989 | Browing | A01M 7/0042 239/121 |
| 5,086,582 A | 2/1992 | Hamilton | |
| 5,465,874 A * | 11/1995 | Roach | A01M 7/0085 222/136 |
| 5,941,416 A | 8/1999 | Balz et al. | |
| 5,984,143 A * | 11/1999 | Pettis | A01M 7/0092 137/607 |
| 6,604,546 B1 * | 8/2003 | Gilmore | B01F 5/0495 137/268 |
| 2011/0079659 A1 | 4/2011 | Wilken et al. | |
| 2011/0142685 A1 * | 6/2011 | Gilpatrick | F04B 49/20 417/34 |

OTHER PUBLICATIONS

Lawn Care Sprayers; http://riverbendind.com/lawncare-sprayers/ (Accessed Aug. 1, 2017).

Dual Tank Poly Skid Sprayers; http://www.randkpump.com/ (Accessed Aug. 1, 2017).

* cited by examiner

MIX ON DEMAND SPRAYER

FIELD OF THE INVENTION

The present invention generally relates to a sprayers, and more particularly to a sprayer configured to dilute a fluid concentrate with a diluent prior to spraying, and still more particularly to a mixing manifold selectively and changeably metered to inject a measured dose of the fluid concentrate into the diluent to produce a mixed fluid with a desired concentrate dilution.

BACKGROUND OF THE INVENTION

Sprayers, such as broadcast sprayers are used across an array of applications, including farms, golf courses and residential properties, to apply water or other liquids, such as pesticides including herbicides, insecticides and the like. As such, these sprayers may need to cover a large area and, therefore, generally include large tanks strapped to a vehicle, such as an all-terrain vehicle (ATV) or golf cart, or may be mounted onto a tow-behind trailer. Typically in use, these tanks are filled with a selected fluid composition that is to be applied. By way of example, pesticide solutions may be anywhere from about 1% to about 10% active chemical in water. In one scenario, a user may spray a diluted herbicide solution, such as to target thistle. However, to apply a second pesticide solution, such as a diluted insecticide to fruit trees, the user will first have to completely empty the tank of the herbicide solution before rinsing the tank of any residual chemicals and finally refilling the tank with the desired insecticide solution. As may be readily apparent from the above, there are numerous drawbacks to such systems. For example and without limitation, such drawbacks may include waste of chemicals, the need for controlled disposal of unused chemicals, the time consuming need to thoroughly clean the tank between applications and the potential for cross-contamination and application of unwanted chemicals after incomplete or unsuccessful cleaning of the tank.

To alleviate some of the above-referenced drawbacks of broadcast sprayers, systems have been developed which segregate the chemical portion from the water/diluent portion of the system. In such systems, the chemical is stored in a smaller, separate tank than the large water tank. Metering devices may then add chemical to a flow of water prior to emission from a wand or boom sprayer. In this manner, the chemical remains isolated from the water tank, thereby minimizing or avoiding possible contamination of the water source. However, heretofore systems require complex plumbing regimes and interconnectivities of the various components making such systems difficult to use and burdensome to operate and clean.

Broadcast sprayers have also been configured as variable pressure sprayers which may selectively spray fluid from either a spray wand or through a boom-and-nozzle arrangement where multiple nozzles may be supported on a boom. Due to the multiple nozzles within the boom-and-nozzle arrangement, fluid must be delivered at high pressure so as to enable proper spraying at each of the individual nozzles. However, a spray wand uses a single nozzle and may become damaged if it receives high pressure fluid. To that end, current systems typically use pumps with a high pressure cut out switch. These systems are configured with a recirculation manifold whereby excess flow from the pump is diverted back to the supply tank. A valve and pressure gauge is provided on the manifold so the user can tune the percentage of flow going back to the tank while maintaining adequate pressure for the lower flow application (spray wand). Without providing for this recirculation pressure bleed off in the low flow application, pressure would build quickly and rapidly cycle the pressure cut off switch. A situation that is detrimental to both the switch and the pump. However, such a system should not be used in two-tank systems as the mixed fluid exiting the pump would be recycled to the water tank, thereby contaminating the water tank and changing the concentration of the chemical that is being sprayed.

Thus, there remains a need for a sprayer that segregates the chemical tank from the water tank but is also more easily plumbed, operated and cleaned. There remains a further need for a variable pressure sprayer wherein the mixed fluid is not recycled to the diluent tank when operating at reduced spraying pressure. The present invention satisfies this as well as other needs.

SUMMARY OF THE INVENTION

In view of the above and in accordance with an aspect of the present invention, the present invention is generally directed to a sprayer system comprising a first tank configured to hold a diluent; a mounting bracket mounted to the first tank; and a second tank removably mounted to the first tank and configured to hold a liquid concentrate. A mixing manifold is mounted to the mounting bracket and has a first inlet fitting configured to receive a fixed amount of diluent from the first tank and a second inlet configured to receive a selectively adjustable amount of liquid concentrate from the second tank. The fixed amount of diluent and selectively adjustable amount of concentrate are combined to form a mixed solution. The mixing manifold includes a mixed solution outlet and a positive displacement pump is mounted to the mounting bracket and has a suction port fluidly coupled to the mixed solution outlet. A pressure port is configured to fluidly couple with a spray device. The second tank may be separable from the first tank without requiring removal of the mixing manifold or positive displacement pump.

In a further aspect of the present invention, the positive displacement pump is a diaphragm pump and the first inlet fitting further includes a check valve configured to prevent backflow of the mixed solution toward the first tank.

In still another aspect of the present invention, the mixing manifold further includes a disc defining a first annular series of spaced-apart flow-metering holes. Successive respective flow-metering holes have an increasing hole diameter and the disc is adapted to rotate to align a selected flow-metering hole in fluid communication with the second inlet to thereby define the selectively adjustable amount of concentrate in the mixed solution. The disc may further define a second annular series of spaced-apart stop holes. Each respective stop hole within the second annular series radially aligns with a respective flow-metering hole of the first annular series. A single respective stop hole receives a stop member when the selected flow-metering hole is aligned with the second inlet. The stop member may be a ball bearing biased to engage the disc wherein a diameter of the ball bearing is slightly larger than a diameter of each of the stop holes.

In another aspect of the present invention, the first inlet fitting may further include a check valve configured to prevent backflow of the mixed solution toward the first tank and the second tank may be removably mounted to the mounting bracket on the first tank.

In still a further aspect of the present invention, the second tank may include a quick disconnect coupling configured to releasably couple a concentrate tube to a tank fitment defined on the second tank. The concentrate tube may then deliver the liquid concentrate to the mixing manifold. The quick disconnect coupling may comprise a fitment housing having a first end, a second end and a stepped bore region therebetween, wherein the first end is coupled to the tank fitment defined on the second tank. A tubing nut may be removably coupled to the second end of the fitment housing and a tubing coupling may be configured to be received within the tubing nut and abut against a mouth opening defined by the second end of the fitment housing. A plug member may have a plug end, a flanged end and a body portion therebetween. The plug end may be received in the first end of the fitment housing while the flanged end may be received within the second end of the fitment housing and the body portion may extend through the stepped bore region of the fitment housing. A biasing member may also be received within the stepped bore region, wherein the biasing member urges the plug end of the plug member to seal the first end of the fitment housing when the tubing nut is removed from the second end of the fitment housing. A biasing force is stored within the biasing member by the flanged end when the tubing nut is coupled to the second end of the fitting housing, whereby fluid concentrate within the second tank can flow through the quick disconnect coupling to the mixing manifold. The body portion of the plug member may comprise a plurality of spaced apart spindles with open slots defined therebetween to permit flow of fluid concentrate therethrough.

In yet another aspect of the present invention, the sprayer system may further include a pressure by-pass recirculation loop fluidly coupling the pressure port to the suction port. The pressure by-pass recirculation loop may be configured to selectively regulate a fluid pressure of the mixed solution being delivered to the spray device. The pressure by-pass recirculation loop may be either internal to the positive displacement pump or an external pathway around the positive displacement pump.

In accordance with another aspect of the present invention, the present invention is generally directed to a sprayer system comprising a first tank configured to hold a diluent; a mounting bracket mounted to the first tank; and a second tank removably mounted to the first tank and configured to hold a liquid concentrate. A mixing manifold is mounted to the mounting bracket and has a first inlet fitting configured to receive a fixed amount of diluent from the first tank and a second inlet configured to receive a selectively adjustable amount of liquid concentrate from the second tank. The fixed amount of diluent and selectively adjustable amount of concentrate are combined to form a mixed solution. The mixing manifold includes a mixed solution outlet and a positive displacement pump is mounted to the mounting bracket and has a suction port fluidly coupled to the mixed solution outlet. A pressure port may be fluidly coupled to at least one spray device. The second tank may be separable from the first tank without requiring removal of the mixing manifold or positive displacement pump. The at least one spray device may be a low pressure spray nozzle or a high pressure boom carrying two or more boom nozzles. Alternatively, the at least one spray device is a low pressure spray nozzle and a high pressure boom carrying two or more boom nozzles whereby the mixed fluid is selectively received by either the low pressure spray nozzle or the high pressure boom. The sprayer system may further include a pressure by-pass recirculation loop fluidly coupling the pressure port to the suction port. The pressure by-pass recirculation loop may be configured to selectively regulate a fluid pressure of the mixed solution being received by the low pressure spray nozzle. The pressure by-pass recirculation loop may be either internal to the positive displacement pump or an external pathway around the positive displacement pump.

Additional objects, advantages and novel aspects of the present invention will be set forth in part in the description which follows, and will in part become apparent to those in the practice of the invention, when considered with the attached figures.

DETAILED DESCRIPTION OF THE PREFERRED EMBODIMENTS

Figure 1:
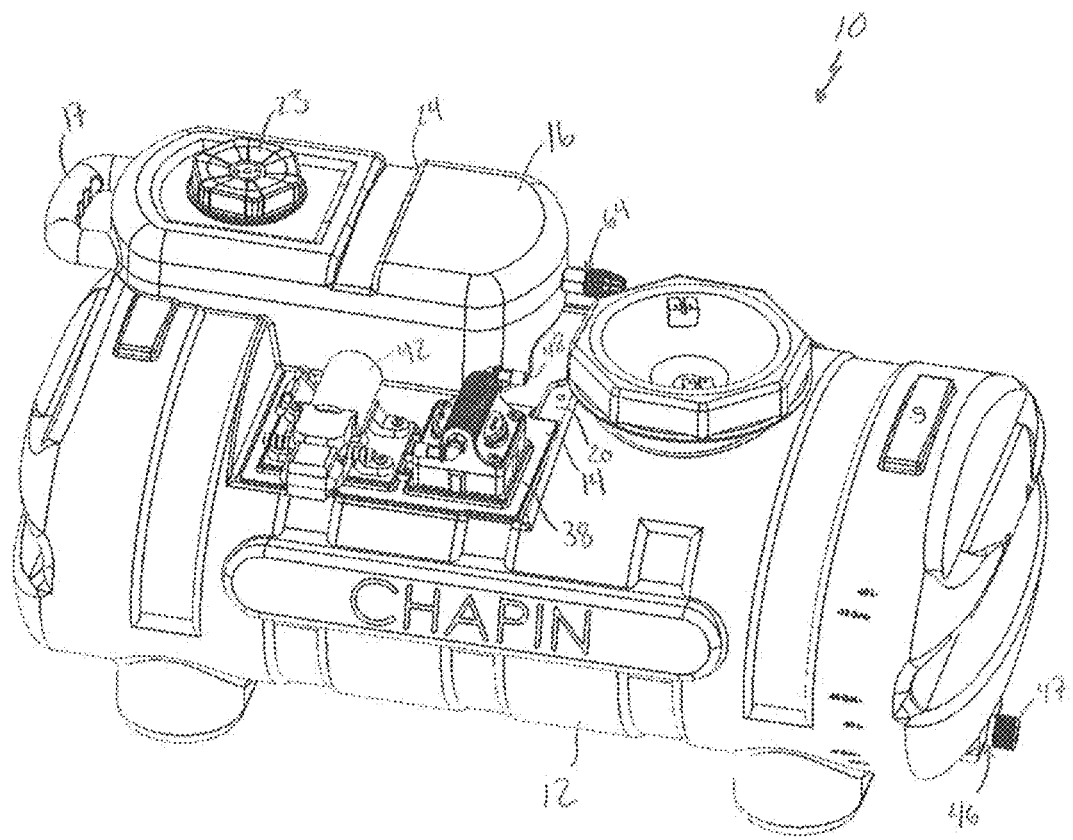
FIG. 1 is a perspective view of a sprayer system in accordance with an aspect of the present invention.
Figure 2:
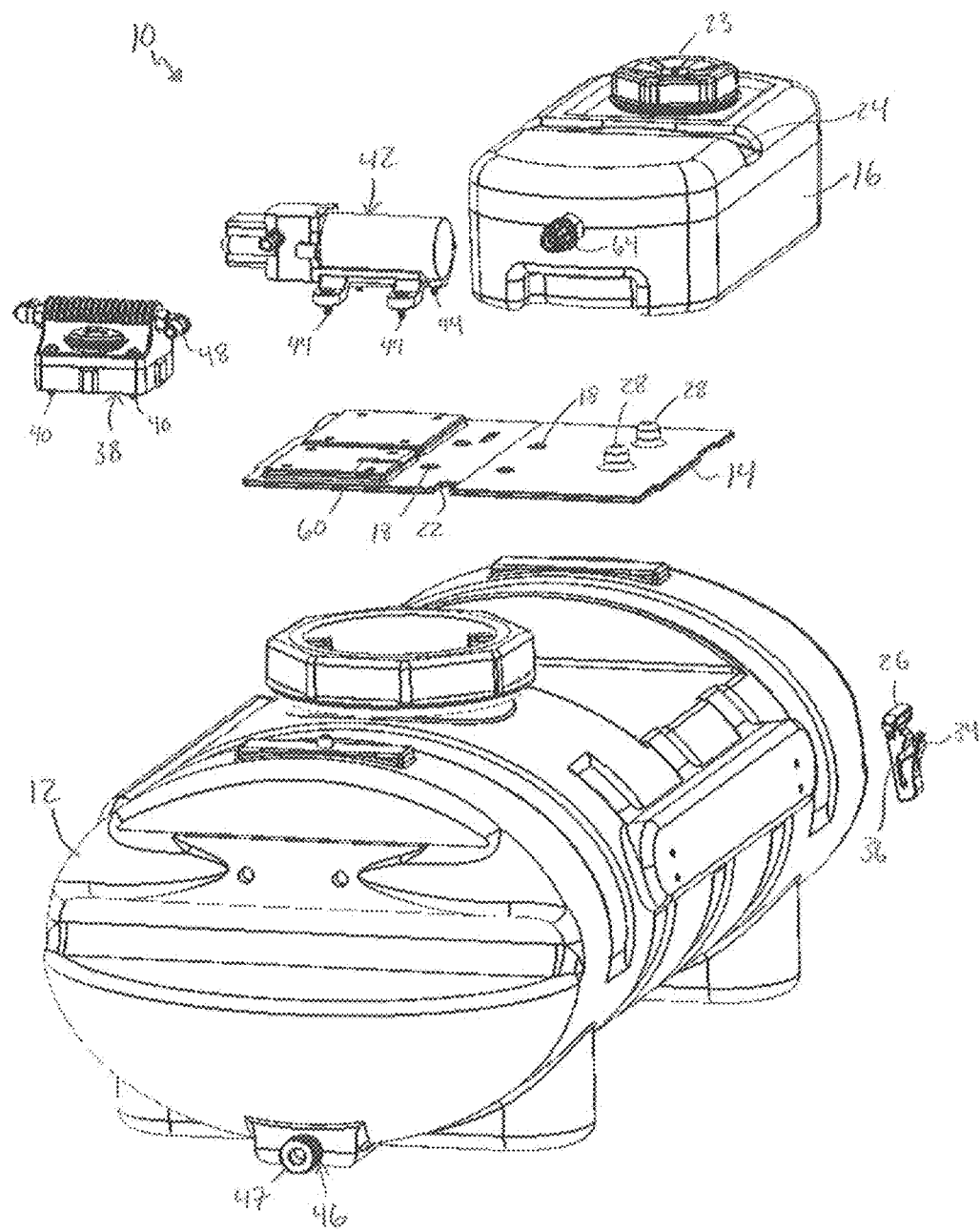
FIG. 2 is an exploded view of the sprayer system shown in FIG. 1.

Referring now to FIGS. 1 and 2, in accordance with an aspect of the present invention, sprayer system 10 may generally comprise a first tank 12, mounting bracket 14, second tank 16, mixing manifold 38 and positive displacement pump 42, such as and without limitation thereto, a diaphragm pump. Mounting bracket 14 may be mounted to first tank 12, such as via mechanical fasteners 18. To provide further support and to resist lateral movement of mounting bracket 14 in the x-z plane, first tank 12 may include a tang 20 configured to reside within a notch 22 defined within mounting bracket 14. Second tank 16 may be mounted to first tank 12 and mounting bracket 14, such as via a strap (not shown). To that end, second tank 16 may include a strap recess 24 configured to receive the strap and first tank 12 may further include a strap tie down clamp 26 whereby movement of second tank 16 in the y-axis is prohibited. To minimize lateral displacement of second tank 16 (i.e., in the x-z plane) mounting bracket 14 may include one or more upwardly extending nodules 28 configured to coincide with matching indentations 30 defined on bottom wall 32 of second tank 16 (see FIG. 6). In this manner, a user may unfasten the strap and lift second tank away from mounting bracket 14 and first tank 12, such as via handle 17, without requiring the use of tools. Strap tie down clamp 26 may further include a wand receiving portion 34 defining a wand receiving recess 36 whereby a spray wand (not shown) may be releasably coupled to sprayer system 10 when the spray wand is not in use. With continued reference to FIGS. 1 and 2, and with additional reference to FIGS. 3 and 4, a mixing manifold 38 may be mounted to mounting bracket 14, such as via mechanical fasteners 40, and positive displacement pump 42 may be mounted to mounting bracket 14 such as via mechanical fasteners 44. In this manner, each of the second tank 16, mixing manifold 38 and positive displacement pump 42 may be individually and separately removed from mounting bracket 14 and first tank 12.

Figure 10:
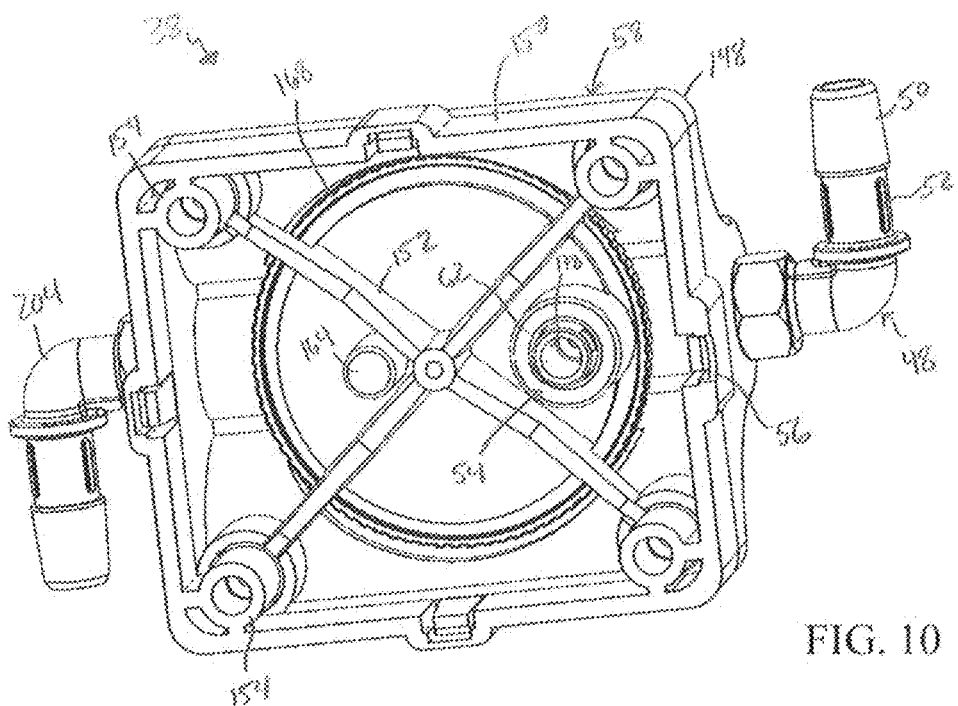
FIG. 10 is a bottom perspective view of the mixing manifold shown in FIG. 9.
Figure 11:
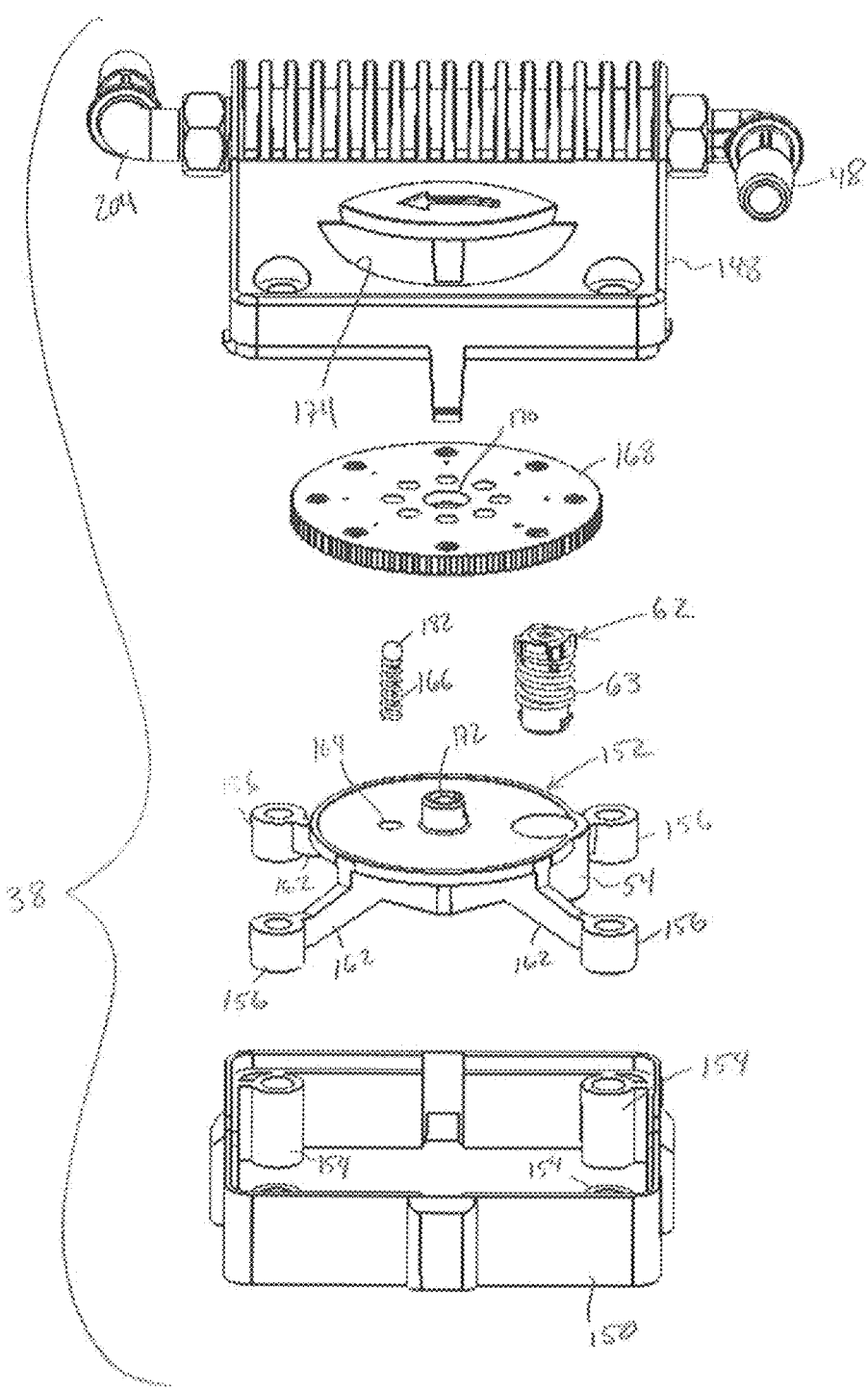
FIG. 11 is a top front exploded view of the mixing manifold shown in FIGS. 9 and 10.
Figure 12:
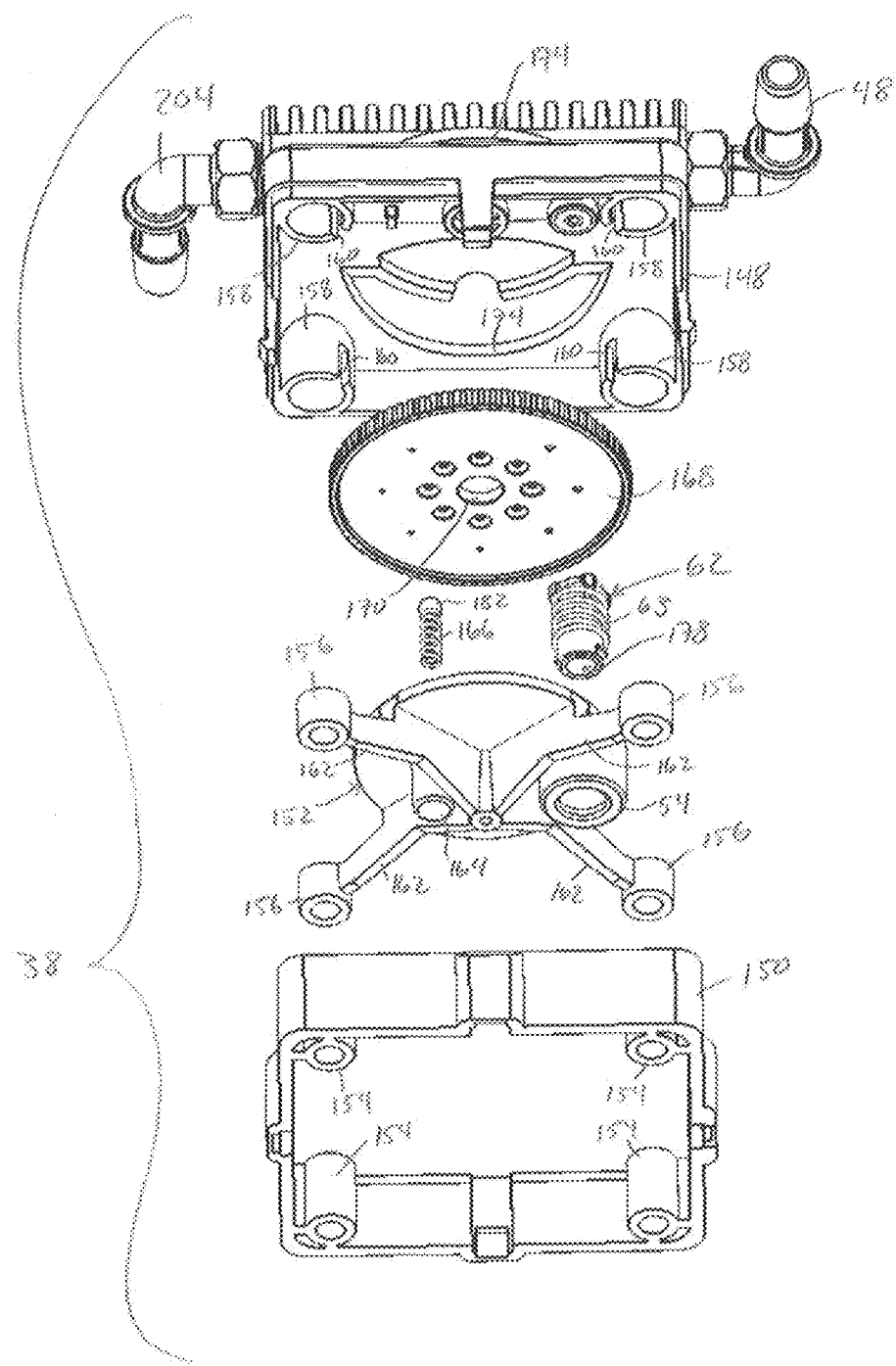
FIG. 12 is a bottom front exploded view of the mixing manifold shown in FIGS. 9 and 10.

In operation, first tank 12 includes a diluent outlet 46 having a diluent fitting 47 configured to receive one end of diluent tubing (not shown) in a substantially fluid-tight seal. The opposing end of the diluent tubing is mounted onto a first inlet fitting 48 of mixing manifold 38 (see also FIGS. 9-13). First inlet fitting 48 may include a tapered nipple 50 and ribbed portion 52 so as to snuggly receive the diluent tubing thereon in a substantially fluid-tight seal. An optional hose clamp (not shown) may also be used to more securely clamp the diluent tubing to ribbed portion 52. Mixing manifold 38 may further include a second inlet 54 configured to receive concentrate tubing (not shown) from second tank 16. As shown most clearly in FIGS. 4 and 10, mixing manifold 38 may include a notch 56 proportioned to permit passage of concentrate tubing through housing 58 of mixing manifold 38. Mounting bracket 14 may also include a recess 60 to accommodate passage of the concentrate tubing (see FIGS. 2 and 4). Thus, a first end of the concentrate tubing may be mounted to fitment 62 housed within second inlet 54. The concentrate tubing may then extend toward second tank 16 wherein the opposing end of the concentrate tubing is mounted to second tank 16 via concentrate outlet fitting 64.

Figure 5:
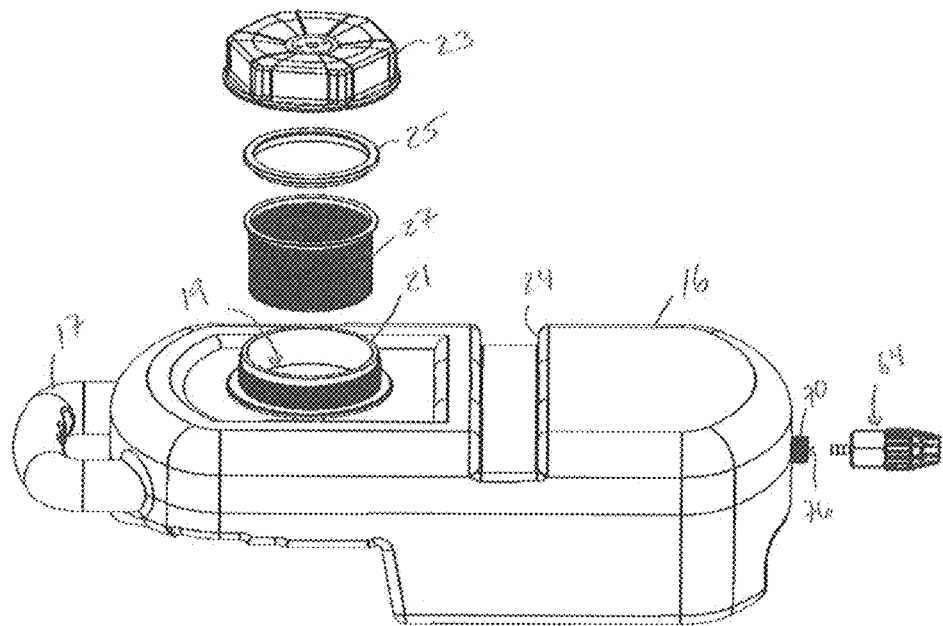
FIG. 5 is an exploded view of a liquid concentrate tank used within the sprayer system shown in FIG. 1.
Figure 6:
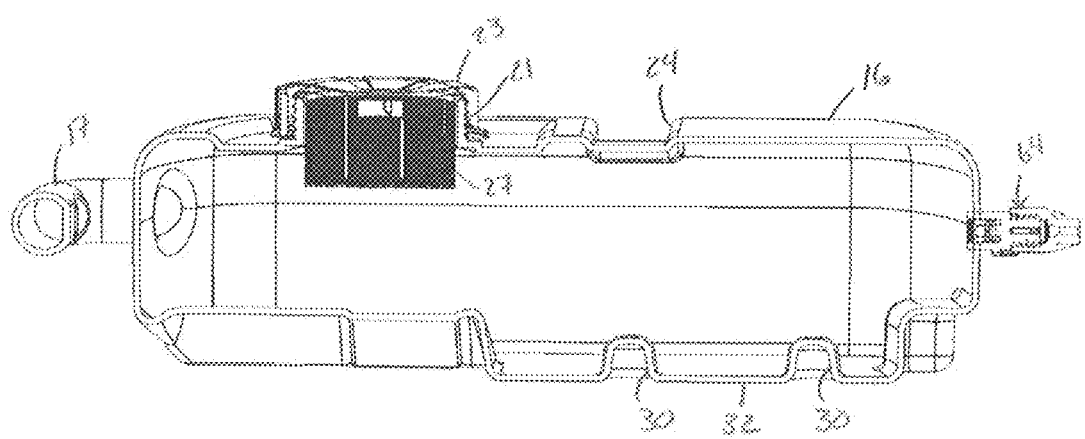
FIG. 6 is a cross section view of the liquid concentrate tank used within the sprayer system shown in FIG. 1.

With reference to FIGS. 5 and 6, second tank 16 may be filled with a selected fluid concentrate through tank opening 19 defined by a threaded mouth portion 21. A cap 23 may be removably threaded onto mouth portion 21 so as to seal second tank 16. An optional O-ring 25 may also facilitate a fluid-tight seal between second tank 16 and cap 23. To prevent clogging of downstream plumbing components, mouth portion 21 may further receive filter element 27 therein. When filling second tank 16 with fluid concentrate, the fluid will pass through filter element 27 whereby particulate matter larger than the pore size of the filter element will be strained out of the fluid. Accordingly, the pore size of filter element 27 should be selected so as to be smaller than the internal diameter of the smallest diameter downstream component, such as disc 168 which will be discussed in greater detail below.

Figures 7, 8:
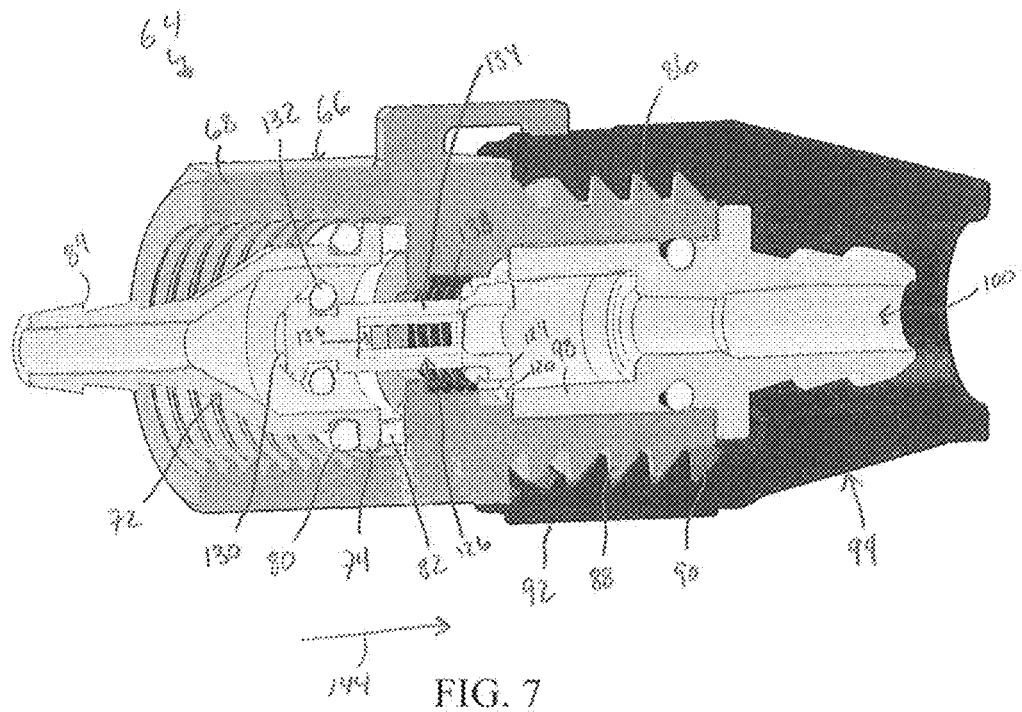
FIG. 7 is a cross section view of a tubing fixture used with the liquid concentrate tank shown in FIG. 5.
FIG. 8 is an exploded cross section view of the tubing fixture shown in FIG. 7.
Figure 9:
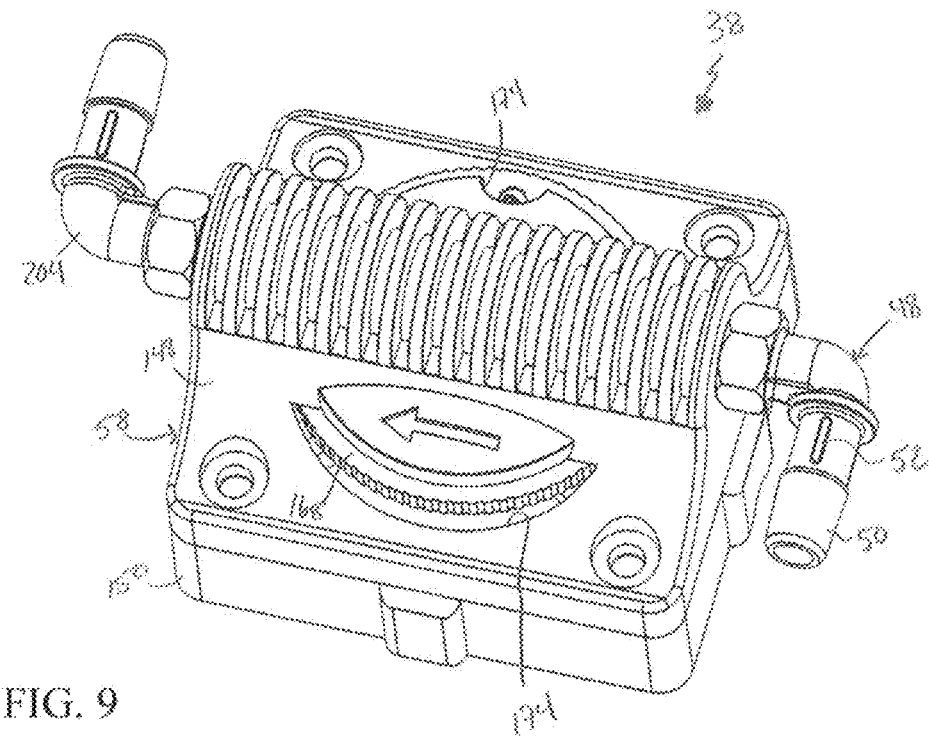
FIG. 9 is a top perspective view of a mixing manifold used within the sprayer system shown in FIG. 1.

With reference to FIGS. 7 and 8, to facilitate tool-less removal of second tank 16 from mounting bracket 16 and mixing manifold 38, concentrate outlet fitting 64 may be a quick disconnect coupling generally comprised of a fitment housing 66 having a first end 68 configured to be threadably coupled to a corresponding tank fitment 70 defined on second tank 16 (see FIG. 5). First end 68 of fitment housing 66 may also be configured to receive a tank tubing coupling 72 whereby tank tubing coupling 72 includes a flanged end 74 proportioned to abut against mouth opening 76 of tank fitment 70 such that tank tubing coupling 72 is entrapped between mouth opening 76 and stepped wall 78 of fitment housing 66 when fitment housing 66 is threaded onto tank fitment 70. To promote a fluid-tight seal between tank fitment 70 and fitment housing 66, one or more seals, such as O-rings 80, 82 may be included. The opposing end of tank tubing coupling 72 may include one or more barbs 84 dimensioned to snuggly receive a concentrate pick-up tube (not shown) which may extend from tank tubing coupling 72 to proximate bottom wall 32 of second tank 16. In this manner, liquid concentrate may be drawn from second tank 16 as will be described in greater detail below.

With continued reference to FIGS. 7 and 8, second end 86 of fitment housing 66 may include male threads 88 configured to threadably engage female threads 90 defined within a first end 92 of tubing nut 94. Second end 86 may further define a bore 96 dimensioned to receive a first end 98 of a concentrate tubing coupling 100 therein upon threaded engagement of tubing nut 94 with fitment housing 66. The opposing end 102 of concentrate tubing coupling 100 may include one or more barbs 104 dimensioned to snuggly receive the opposing end of the concentrate tubing as described above. Annular flange 106 on concentrate tubing coupling may engage seat portion 95 of tubing nut 94 such that tubing nut 94 may permit mounting of concentrate tubing coupling 100 to second tank 16 with minimal, if any, twisting of the concentrate tubing as tubing nut 94 is rotatably threaded onto male threads 88. To assist in properly seating concentrate tubing coupling 100 within fitment housing 66, annular flange 106 may also be dimensioned to abut against the mouth opening 110 of bore 96 when tubing nut 94 is fully tightened. An O-ring seal 112 may also promote a fluid-tight seal between concentrate tubing coupling 100 and bore 96 of fitment housing 66.

In a further aspect of the invention, bore 96 may be further include a series of steps 114, 116, 118 thereby defining bore regions 96a, 114a, 116a, 118a. Concentrate tubing coupling 100 may reside within bore region 96a such that terminal end 120 of first end 98 of concentrate tubing coupling 100 may seat against step 114. The wall thickness of terminal end 120 may be selected so that internal bore 122 of concentrate tubing coupling 100 is slightly smaller than the diameter of bore region 114a. In this manner, terminal end 120 partially occludes bore region 114a whereby flanged end 124 of plug member 126 may be engaged by concentrate tubing coupling 100 as tubing nut 94 is threaded onto fitment housing 66. Bore region 114a may be proportioned to receive flanged end 124 while step 116 has a smaller diameter than flanged end 124 whereby flanged end 124 is precluded from entering bore region 116a. Plug member 126 may further include a body portion 128 dimensioned to pass through and extend within bore regions 116a, 118a before terminating at a second end 130. Second end 130 of plug member 126 may include an O-ring seal 132 having an external diameter greater that the diameter of bore region 118a. In one aspect of the invention, body portion 128 may be comprised of a plurality of spaced-apart spindles 134 configured to define open slots 136 therebetween so as to promote fluid travel through plug member 126, as will be discussed in greater detail below.

Plug member 126 may translate along longitudinal axis L of fitment housing 66 so as to selectively plug or unplug bore region 118a and control outflow of liquid concentrate from second tank 16 to mixing matrix 38. To that end, as shown in FIG. 7, tubing nut 94 may be threadably coupled to fitment housing 66 to thereby secure concentrate tubing coupling 100 therein. Terminal end 120 of concentrate tubing coupling 100 engages flanged end 124 of plug member 126 so as to direct second end 130 a spaced distance from bore region 118*a*. In this position, fluid may flow from second tank 16 through tank tubing coupling 72, fitment housing 66 and the concentrate tubing coupling before passing to mixing manifold 38.

Fitment housing 66 may further include a biasing member, such as compression spring 138, configured to engage flanged end 124 at a first end 140 and step 118 at second end 142. In this manner, threading of tubing nut 94 and concentrate tubing coupling 100 may compress spring 138 to thereby cause potential energy to be stored within spring 138. Unthreading of tubing nut 94 and removal of concentrate tubing coupling 100 from fitment housing 66 enables spring 138 to release the stored potential energy so as to cause plug member 126 to translate along longitudinal axis L generally in the direction generally indicated by arrow 144. Plug member 126 will continue to translate until O-ring 132 engages surface 146 of fitment housing 66 whereby O-ring 132 and second end 130 of plug member 126 occlude bore region 118*a*. In this manner, fluid concentrate may no longer flow into concentrate tubing coupling 100. As a result, second tank 16 may be rendered substantially leak proof. Second tank 16 may then be removed from mounting bracket 14 as described above and stored with minimal to no loss of liquid concentrate.

In accordance with an aspect of the invention, following removal of second tank 16 as described above, a replacement second tank (not shown) may be mounted to mounting bracket 14. Tubing nut 94 and concentrate tubing coupling 100 may then be threaded onto a fitment housing (similar to fitment housing 66) on the replacement second tank as described above. As a result, the plug member within the fitment housing may be opened so as to allow transfer of the alternative liquid concentrate within the replacement second tank to mixing manifold 38 as described above. In a further aspect of the invention, a replacement second tank may be filled with water so as to enable flushing of the system between chemicals that are to be sprayed, thereby reducing cross-contamination or misapplication of the chemicals. Thus, sprayer system 10 may be configured to selectively spray any number of various liquid concentrates requiring only the removal and replacement of selected second tanks and remounting of tubing nut 94 and concentrate tubing coupling 100. Respective second tanks may be stored with little to no threat of leakage of respective liquid concentrates contained therein, thereby reducing waste of the concentrates. Moreover, user exposure to a concentrate is minimized as the second tank does not need to be emptied, washed and refilled every time a new liquid concentrate desired to be sprayed.

Turning now to FIGS. 9-13, various views of mixing manifold 38 are shown. As can be seen, housing 58 of mixing manifold 38 may be generally comprised of upper 148 and lower 150 housing subunits. Manifold support member 152 may be interposed between subunits 148, 150. To that end, the interior corners of lower housing subunit 150 may include nodules 154 dimensioned such that respective feet 156 on manifold support member 152 seat upon respective nodules 154. Upper housing subunit 148 may include respective lobes 158 dimensioned to receive a respective foot 156 therein. Each lobe 158 may also include a notch 160 for permitting passage therethrough of a respective leg 162 on manifold support member 152. In this manner, manifold support member 152 may be securely seated within manifold housing 58 and be constrained so as to prevent lateral and torsional movement of manifold support member 152. As described above, manifold support member 152 includes second inlet 54 configured to receive fitment 62. Manifold support member 152 may further include a spring well 164 dimensioned to receive a stop spring 166, as will be discussed in greater detail below.

Figure 14:
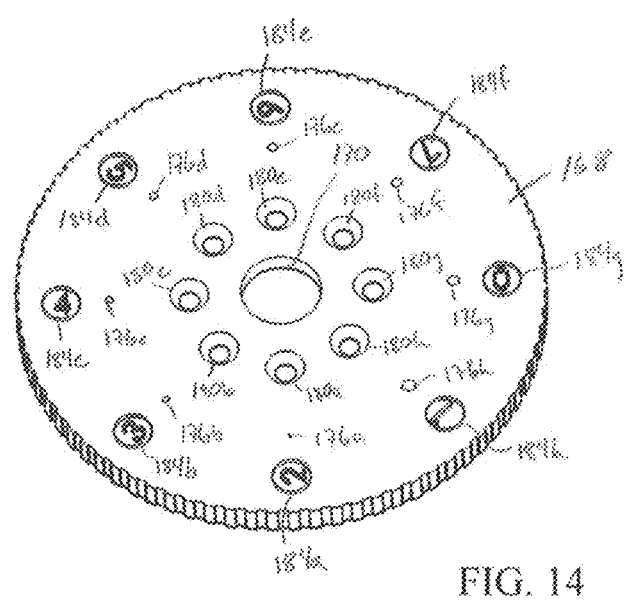
FIG. 14 is an isolated view of a disc used within the mixing manifold shown in FIGS. 9 through 13.

Mixing manifold 38 may further include disc 168 rotatably mounted atop manifold support member 152 whereby center hole 170 defined by disc 168 receives post 172 formed on manifold support member 152. Disc 168 may then be capped by upper housing subunit 148 wherein upper housing subunit 148 includes one or more openings 174 therethrough such that a portion of the outer circumference of disc 168 may be engaged by a user so as to selectively rotate disc 168 about post 172. With additional reference to FIG. 14, disc 168 may further define an outer annular series of spaced-apart through-holes, such as flow metering holes 176*a*-176*h*. Each of flow metering holes 176*a*-176*h* may have a slightly larger diameter than the immediately preceding flow metering hole. In operation one of holes 176*a*-176*h* is aligned with internal bore 178 defined by fitment 62. Fitment spring 63 may urge fitment 62 against disc 168 so as to create and maintain a substantially fluid-tight seal between fitment 62 and disc 168. In this manner, a user may selectively control the volume of liquid concentrate that may pass through disc 168, as will be discussed in greater detail below.

Disc 168 may also further define an inner annular series of spaced apart through-holes, such as chamfered spring stop holes 180*a*-180*h*. Each respective spring stop hole 180*a*-180*h* is configured to align radially with its respective flow metering hole 176*a*-176*h*. In operation, a selected one of holes 180*a*-180*h* is aligned with spring well 164 whereby a positive stop member, such as ball bearing 182, seats within a portion of the selected spring stop hole 180*a*-180*h* through urging of stop spring 166 resident within spring well 164. In this manner, a user may receive feedback indicating proper alignment of the selected flow metering hole 176*a*-176*h* upon seating of ball bearing 182. To change the amount of liquid concentrate added to the diluent stream, a user may rotate disc 168 whereby disc 168 may apply downward force against ball bearing 182 so as to compress stop spring 166 within spring well 164. Disc 168 may then be further rotated until the desired flow metering hole 176*a*-176*h* is aligned with internal bore 178 of fitment 62 such that ball bearing 182 seats within the desired spring stop hole 180*a*-180*h*. As most clearly shown in FIG. 14, disc 168 may also include respective indicia 184*a*-184*h* proximate a respective flow metering hole 176*a*-176*h*. Indicia 184*a*-184*h* may correlate with the respective diameter of respective flow metering holes 176*a*-176*h* so as to provide visual indication to the user as to which of the respective flow metering holes 176*a*-176*h* is currently aligned with internal bore 178 of fitment 62.

Figure 13:
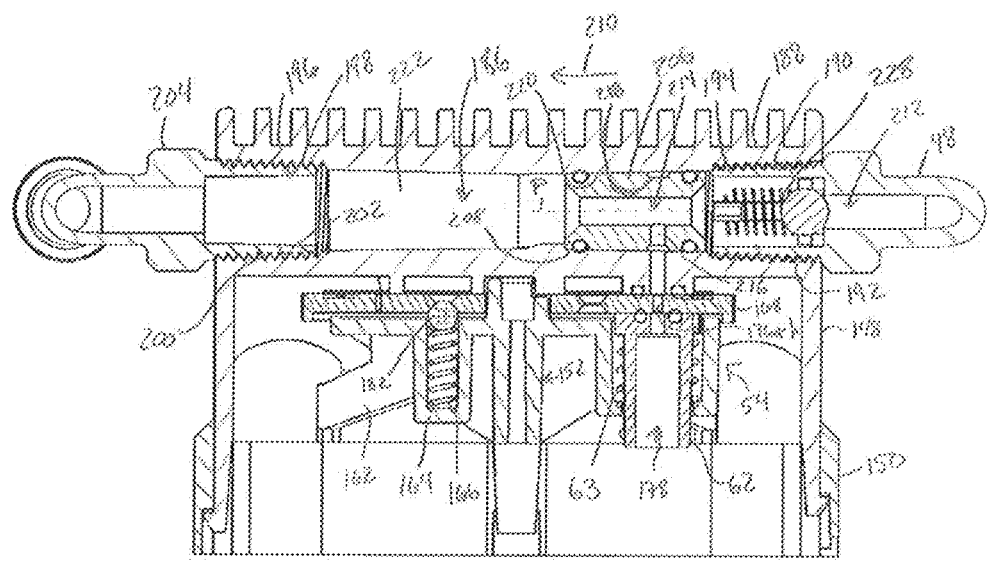
FIG. 13 is a cross section view of the mixing manifold, taken generally along line 13-13 in FIG. 9.

As seen most clearly in FIG. 13, mixing manifold 38 may include a fluid channel 186 wherein a first end 188 of fluid channel 186 may define female threads 190 configured to matingly receive corresponding male threads 192 defined by manifold terminus 194 of first inlet fitting 48. The opposing second end 196 of fluid channel 186 may similarly define female threads 198 configured to matingly receive corresponding male threads 200 on manifold terminus 202 of manifold outlet fitting 204. A flow plug 206 may be interposed within fluid channel 186 adjacent the internal extent of female threads 190. Fluid channel 186 may further define a step 208 so as to provide a positive stop to insertion of flow plug 206 in the direction generally indicated by arrow 210. In this manner, bore 212 of first inlet fitting 48 may align with the longitudinal axis P of longitudinal bore 214 of flow plug 206 whereby a constant volume of diluent may be received from first tank 12 after flowing through first inlet fitting 48 into flow plug 206.

As further seen in FIG. 13, flow plug 206 may further include a radially extending bore 216 which may be configured to fluidly align with one of flow metering holes 176a-176h and internal bore 178 of fitment 62. In this manner, a user selected volume of liquid concentrate may be received from second tank 16, wherein the selected volume of liquid concentrate is then mixed with, and diluted by, the constant volume of diluent being received through first inlet 48 as described above. Flow plug 206 may also define an annular groove 218 configured to define a fluid tight channel with internal wall surface 220 of mixing manifold 38. Annular groove 218 coincides with radially extending bore 216 such that fluid concentrate may still pass through radially extending bore 216 into longitudinal bore 214 should radially extending bore 216 be misaligned with one of flow metering holes 176a-176h and internal bore 178. Fluid channel 186 may further define a mixing chamber portion 222 which may further promote mixing of the diluent and fluid concentrate prior to outputting the mixed fluid through manifold outlet fitting 204.

Figure 3:
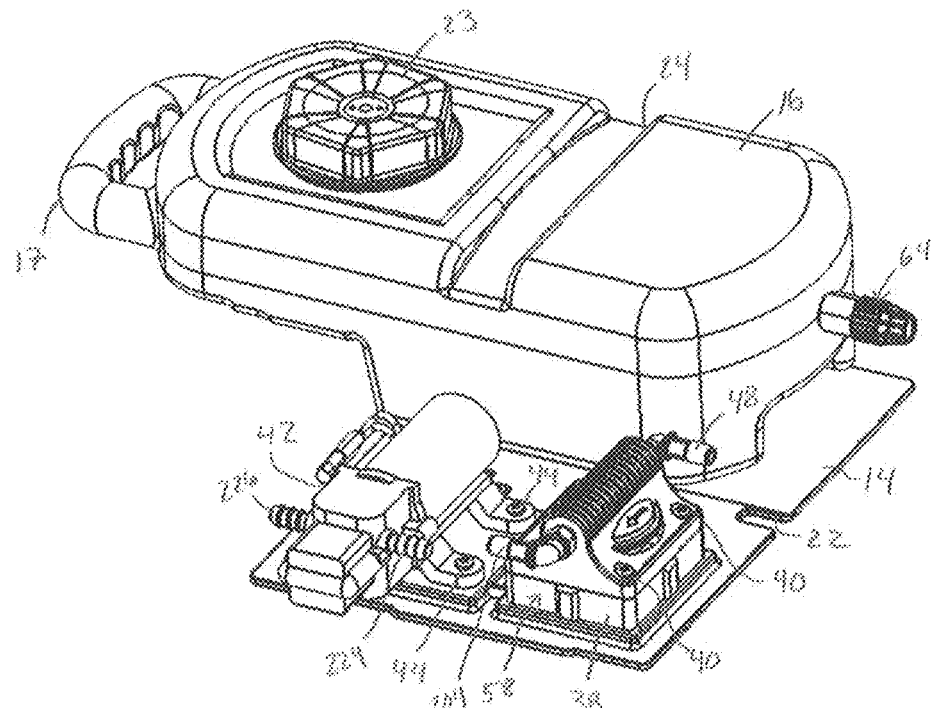
FIG. 3 is a front perspective view of the sprayer system shown in FIG. 1 with the diluent tank removed.
Figure 4:
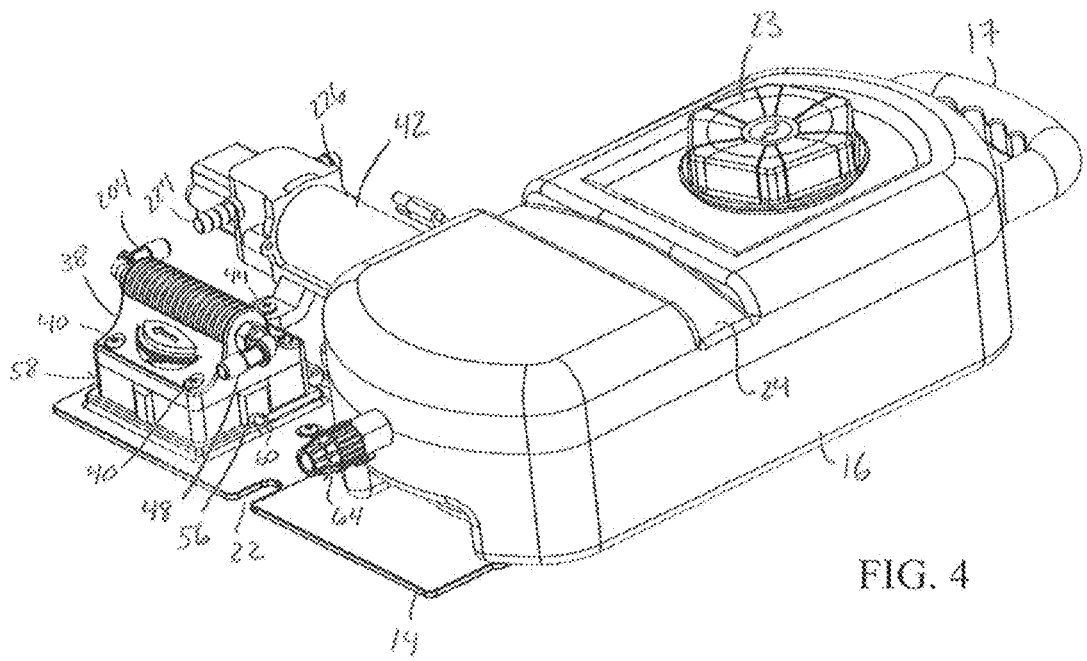
FIG. 4 is a rear perspective view of the sprayer system shown in FIG. 3.

With reference to FIGS. 3 and 4, manifold outlet tubing (not shown) may fluidly couple manifold outlet fitting 204 with positive displacement pump suction port 224. In this manner, upon a suction stroke of positive displacement pump 42, mixed fluid is drawn into pump 42 from mixing manifold 38. As described above, the mixed fluid is comprised of a constant volume of diluent into which is charged a user-selected volume of liquid concentrate. Thus, on a pressure stroke of pump 42, the mixed fluid is forced out of pressure port 226 of positive displacement pump 42. Pressure port 226 may be fluidly coupled to a spray device, such as a spray wand or boom sprayer (not shown). To prevent backflow of mixed fluid through first inlet fitting 48 into first tank 12, first inlet fitting 48 may include a check valve 228 (see FIG. 13). In this manner, cyclical operation of positive displacement pump 42 will alternately draw mixed fluid from mixing manifold 38 and discharge this mixed fluid through an attached sprayer whereby the concentration of the fluid concentrate dilution is selected, and easily modified by, the user through setting of disc 168. In should be understood by those skilled in the art that positive displacement pump 42 may be powered by any suitable power source, such as a dedicated battery or through wiring pump 42 to the battery of the vehicle (e.g., ATV or golf cart).

Figure 15:
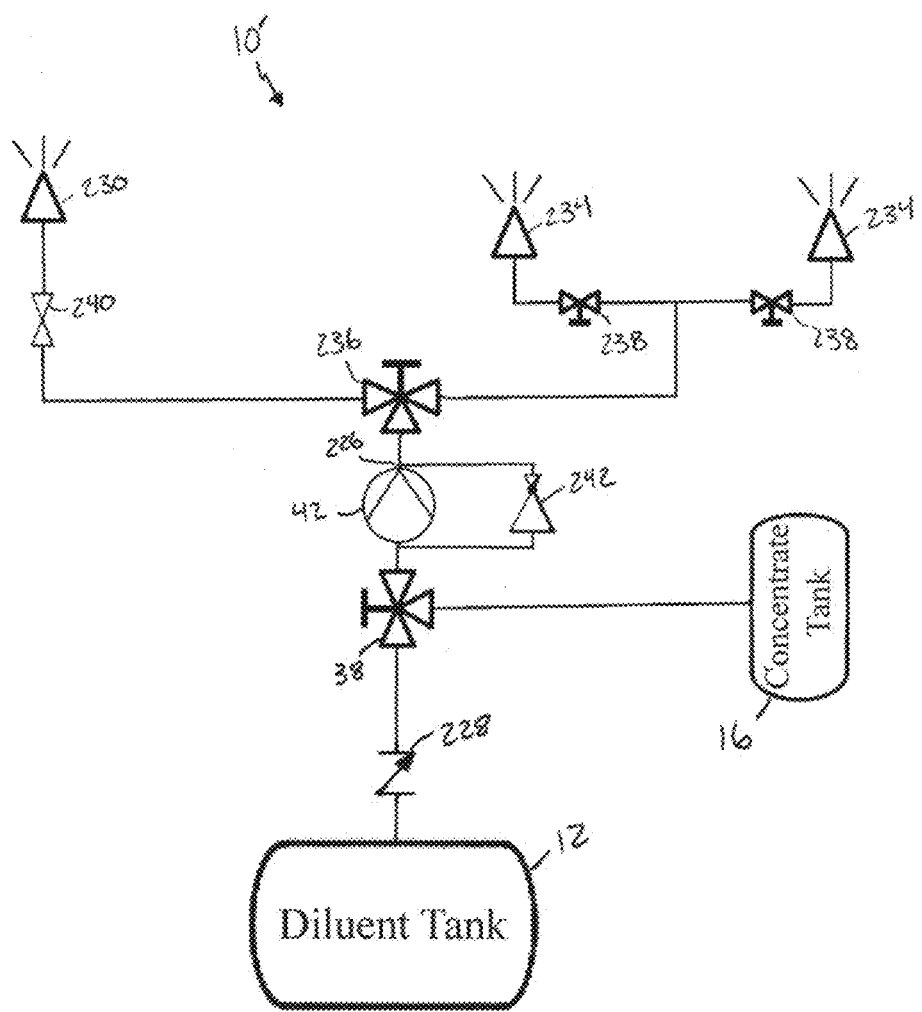
FIG. 15 is a schematic view of a pressure by-pass system suitable for use within a variable pressure sprayer system in accordance with an aspect of the present invention.

Turning now to FIG. 15, a sprayer system 10' may be configured to operate as a variable pressure sprayer. Sprayer system 10' may include first tank 12 and second tank 16 each fluidly coupled to mixing manifold 38 as described above with regard to sprayer system 10. Check valve 228 may be interposed between mixing manifold 38 and first tank 12 to prevent backflow of mixed fluid into first tank 12, also as described above. Mixed fluid may be drawn from mixing manifold 38 through operation of positive displacement pump 42 whereby the mixed fluid is output through pressure port 226. The mixed fluid may then be selectively delivered to a spray nozzle 230 (such as a handheld sprayer) or to a boom 232 upon which are mounted a plurality of boom nozzles 234.

In accordance with one aspect of the invention, flow to spray nozzle 230 or boom 232 may be selectively controlled by a selector valve 236. Flow control at each boom nozzle 234 may also be further controlled by respective ball valve 238. Spray nozzle 230 may also include a pressure reducing valve 240 which is metered to control the fluid pressure of the mixed fluid entering spray nozzle 230 so as to minimize or prevent damage to spray nozzle 230.

Positive displacement pump 42 may include a pressure by-pass recirculation loop 242 fluidly coupling pressure port 226 with suction port 224. Pressure by-pass recirculation loop 242 may operate to decrease the fluid pressure of the mixed fluid being delivered to spray nozzle 230 while also maintaining segregation of the mixed fluid from either first tank 12 or second tank 16. Pressure by-pass recirculation loop 242 may be either internal to positive displacement pump 42 of may be en external pressure by-pass loop around positive displacement pump 42.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A sprayer system comprising:
    a) a first tank configured to hold a diluent;
    b) a mounting bracket fixedly mounted to the first tank;
    c) a second tank removably mounted to the first tank and configured to hold a liquid concentrate;
    d) a mixing manifold directly mounted to the mounting bracket, wherein the mixing manifold has a first inlet fitting configured to receive a fixed amount of diluent from the first tank and a second inlet configured to receive a selectively adjustable amount of liquid concentrate from the second tank, whereby the fixed amount of diluent and selectively adjustable amount of concentrate are combined to form a mixed solution, and wherein the mixing manifold includes a mixed solution outlet; and
    e) a positive displacement pump directly mounted to the mounting bracket and having a suction port fluidly coupled to the mixed solution outlet and a pressure port, wherein the pressure port is configured to fluidly couple with a spray device,
    wherein the second tank is separable from the first tank without requiring removal of the mounting bracket, mixing manifold or positive displacement pump from the first tank.

2. The sprayer system of claim 1 wherein the positive displacement pump is a diaphragm pump.

3. The sprayer system of claim 1 wherein the mixing manifold further includes a disc defining a first annular series of spaced-apart flow-metering holes, wherein successive respective flow-metering holes have an increasing hole diameter, wherein the disc is adapted to rotate to align a selected flow-metering hole of the annular series of spaced-apart holes in fluid communication with the second inlet to thereby define the selectively adjustable amount of concentrate in the mixed solution.

4. The sprayer system of claim 3 wherein the disc further defines a second annular series of spaced-apart stop holes, wherein each respective stop hole within the second annular series radially aligns with a respective flow-metering hole of the first annular series, wherein a single respective stop hole receives a ball bearing when the selected flow-metering hole is aligned with the second inlet.

5. The sprayer system of claim 4 wherein the ball bearing is biased to engage the disc, and wherein a diameter of the ball bearing is slightly larger than a diameter of each of the stop holes.

6. The sprayer system of claim 1 wherein the first inlet fitting further includes a check valve configured to prevent backflow of the mixed solution toward the first tank.

7. The sprayer system of claim 1 wherein the second tank is removably mounted to the mounting bracket on the first tank.

8. The sprayer system of claim 1 wherein the second tank includes a quick disconnect coupling configured to releasably couple a concentrate tube to a tank fitment defined on the second tank, whereby the concentrate tube delivers the liquid concentrate to the mixing manifold.

9. The sprayer system of claim 8 wherein the quick disconnect coupling comprises:
  a) a fitment housing having a first end, a second end and a stepped bore region therebetween, wherein the first end is coupled to the tank fitment defined on the second tank;
  b) a tubing nut removably coupled to the second end of the fitment housing;
  c) a tubing coupling configured to be received within the tubing nut and abut against a mouth opening defined by the second end of the fitment housing;
  d) a plug member having a plug end, a flanged end and a body portion therebetween, wherein the plug end is received in the first end of the fitment housing, the flanged end is received within the second end of the fitment housing and the body portion extends through the stepped bore region of the fitment housing; and
  e) a spring received within the stepped bore region, wherein the spring urges the plug end of the plug member to seal the first end of the fitment housing when the tubing nut is removed from the second end of the fitment housing, and wherein a biasing force is stored within the spring by the flanged end when the tubing nut is coupled to the second end of the fitting housing, whereby fluid concentrate within the second tank can flow through the quick disconnect coupling to the mixing manifold.

10. The sprayer system of claim 9 wherein the body portion of the plug member comprises a plurality of spaced apart spindles with open slots defined therebetween.

11. The sprayer system of claim 1 further comprising:
  f) a pressure by-pass recirculation loop fluidly coupling the pressure port to the suction port and configured to selectively regulate a fluid pressure of the mixed solution being delivered to the spray device.

12. The sprayer system of claim 11 wherein the pressure by-pass recirculation loop is either internal to the positive displacement pump or an external pathway around the positive displacement pump.

13. A sprayer system comprising:
  a) a first tank configured to hold a diluent;
  b) a mounting bracket fixedly mounted to the first tank;
  c) a second tank removably mounted to the first tank and configured to hold a liquid concentrate;
  d) a mixing manifold directly mounted to the mounting bracket, wherein the mixing manifold has a first inlet fitting configured to receive a fixed amount of diluent from the first tank and a second inlet configured to receive a selectively adjustable amount of liquid concentrate from the second tank, whereby the fixed amount of diluent and selectively adjustable amount of concentrate are combined to form a mixed solution, and wherein the mixing manifold includes a mixed solution outlet;
  e) a positive displacement pump directly mounted to the mounting bracket and having a suction port fluidly coupled to the mixed solution outlet and a pressure port; and
  f) at least one spray device fluidly coupled to the pressure port and configured to receive the mixed solution,
  wherein, the second tank is separable from the first tank without requiring removal of the mounting bracket, mixing manifold or positive displacement pump from the first tank.

14. The sprayer system of claim 13 wherein the at least one spray device is a low pressure spray nozzle or a high pressure boom carrying two or more boom nozzles.

15. The sprayer system of claim 13 wherein the at least one spray device is a low pressure spray nozzle and a high pressure boom carrying two or more boom nozzles whereby the mixed fluid is selectively received by either the low pressure spray nozzle or the high pressure boom.

16. The sprayer system of claim 15 further comprising:
  g) a pressure by-pass recirculation loop fluidly coupling the pressure port to the suction port and configured to selectively regulate a fluid pressure of the mixed solution being received by the low pressure spray nozzle.

17. The sprayer system of claim 16 wherein the pressure by-pass recirculation loop is either internal to the positive displacement pump or an external pathway around the positive displacement pump.

* * * * *